United States Patent [19]
Armogan et al.

[11] Patent Number: 5,483,743
[45] Date of Patent: Jan. 16, 1996

[54] METHOD OF HERMETICALLY SEALING A PLASTIC CONNECTOR

[75] Inventors: Lloyd Armogan, Coon Rapids; Christina M. Schober, Saint Anthony; Steven P. Valley, Shoreview, all of Minn.

[73] Assignee: Honeywell Inc., Minneapolis, Minn.

[21] Appl. No.: 126,955

[22] Filed: Sep. 24, 1993

[51] Int. Cl.⁶ .................................................. H01R 43/00
[52] U.S. Cl. ............................................. 29/883; 29/885
[58] Field of Search ........................... 29/883, 884, 885; 174/52.3, 50.52, 50.53, 50.57, 50.61, 50.62; 439/271, 276, 936

[56] References Cited

U.S. PATENT DOCUMENTS

| | | | |
|---|---|---|---|
| 3,435,520 | 4/1969 | Copeland | 29/884 |
| 3,522,575 | 8/1970 | Watson . | |
| 3,770,878 | 11/1975 | Dozier . | |
| 4,131,331 | 12/1978 | Kendall, Jr. | 439/936 |
| 4,335,932 | 6/1982 | Herrmann, Jr. | 439/276 |
| 4,657,323 | 4/1987 | Erbe | 29/883 |
| 4,775,333 | 10/1988 | Grider . | |
| 4,793,060 | 12/1988 | Pretchel . | |
| 4,913,673 | 4/1990 | Kobler . | |
| 4,960,391 | 10/1990 | Beinhaur et al. | 439/559 |
| 4,976,634 | 12/1990 | Green . | |
| 5,044,992 | 9/1991 | Dzuonczyk . | |
| 5,060,108 | 10/1991 | Baker . | |
| 5,151,045 | 9/1992 | Cravens et al. | 439/271 |

FOREIGN PATENT DOCUMENTS

| | | |
|---|---|---|
| 0514640 | 11/1992 | European Pat. Off. . |
| 4014623 | 11/1991 | Germany . |
| 2046533 | 11/1980 | United Kingdom . |
| 2207079 | 5/1987 | United Kingdom . |
| 2257579 | 6/1992 | United Kingdom . |

OTHER PUBLICATIONS

Emerson & Cuming "Technical Data: Stycast® 2850 FT Epoxy Encapsulant (with Catalysts 9, 11, 24LV)", 1989, pp. 1–4.

3M "3M Scotch–Weld™ Technical Data: 2214 Epoxy Adhesives", Mar. 1, 1992, pp. 1–8.

IBM Technical Disclosure Bulletin, vol. 25, No. 6, Nov. 1982, New York US pp. 2928–2929. A. Van Vechten & R. J. Von Gutfeld, 'Stress Diffusing Base for Connector Pins'.

IBM Technical Disclosure Bulletin, vol. 9, No. 11, 11 Apr. 1967, New York US pp. 1505–1506, T. J. Copeletti, 'Technique for Forming Electrical Sockets'.

*Primary Examiner*—P. W. Echols
*Attorney, Agent, or Firm*—Thomas A. Rendos

[57] ABSTRACT

A process for providing hermetically sealed electrical connectors is provided. This process is applicable to both new parts and existing connectors which need to be reworked due to the development of a leak. The process utilizes a plastic connector housing which provides the advantages of low cost and easy moldability or machineability.

22 Claims, 5 Drawing Sheets

METHOD OF HERMETICALLY SEALING A PLASTIC CONNECTOR

BACKGROUND OF THE INVENTION

The present invention relates to a hermetically sealed electrical connector. More specifically, the connector is used to pass electrical signals from the interior to the exterior of a hermetically sealed container. A process is disclosed to achieve a robust, hermetically sealed connector.

In certain environments, it is necessary to isolate electrical equipment from the outside world. In many applications this is accomplished by placing the necessary elements within some type of canister or container, and then hermetically sealing the container to avoid any environmental contamination such as humidity and undesired gases.

When using hermetically sealed canisters, it is typically necessary to pass electrical signals from the exterior of these canisters to the interior. These electrical signals may be power supplies, control signals, or readout signals. In order to maintain the integrity of the hermetic seal around such a canister, it is necessary that the connectors, or devices for passing electrical signals from the exterior to the interior, maintain the integrity of the hermetic seal.

Many materials can be used to fabricate the necessary connectors, such as metals, machineable plastics, or moldable plastics. An example of a machineable, or moldable, plastic used for fabricating connectors is Ryton®.

The problem with many machined plastic connectors is their inability to maintain the integrity of their hermetic seal. For example, many connectors begin to leak after they have been temperature-cycled for a period of time. Once the seal begins to leak, many problems are created since this destroys the entire reason for hermetically sealing a container.

Many of the aforementioned leaks result from inadequate sealing techniques. The use of incorrect sealants, or potting materials, results in unnecessary stresses in the connector due to filler settling. Filler material placed in the sealant results in a coefficient of thermal expansion (CTE) differential within the cured sealant itself. If the filler material settles in the sealant (the filler migrates to one area within sealant), the CTE differential creates a much larger problem due to the possibility of increased thermal expansion. This CTE differential, in conjunction with any inherent CTE differential within the plastic connector, causes stresses during thermal cycling resulting in leaks. Furthermore, high shear stress occurs in the sealant-connector housing interface as the connector is exposed to high and low temperatures. This high shear stress causes the hermetic seal to leak.

SUMMARY OF THE INVENTION

It is an object of the present invention to provide a process to hermetically seal a plastic connector. The desired seal will maintain its integrity over a large number of temperature cycles.

It is a further object of the present invention to provide a process to rework existing electrical connectors which have been found to have leaks therein. The process will then establish a new seal in these connectors which will withstand a large number of temperature cycles.

The process of the present invention starts by doing adequate surface preparation of the connector housing itself. The sealing cavity is abraded using alumina or an equivalent thereof. This abrasion will provide adequate adhesion of the sealant, or potting material, to the walls of the sealing cavity. Next, the parts are washed to remove abrasion residue and then baked to dry. Once cleaned and dried, an appropriate sealant, or potting material, is placed within the sealing cavity. This sealant, or potting material, provides appropriate adhesion to the walls of the sealing cavity and the connector pins themselves. Next, the sealant or sealing compound is initially cured at a low temperature to minimize meniscus formation. Lastly, the sealant is cured at a higher temperature to obtain full cure strength. The compound chosen as a sealant, or potting material, is a high temperature resistant compound which is homogenous, and has minimal settling of filler material.

BRIEF DESCRIPTION OF THE DRAWINGS

Further objects and advantages of the present invention can be seen by reading the following detailed description in conjunction with the drawings in which.

DESCRIPTION OF THE PREFERRED EMBODIMENT

Figure 1:
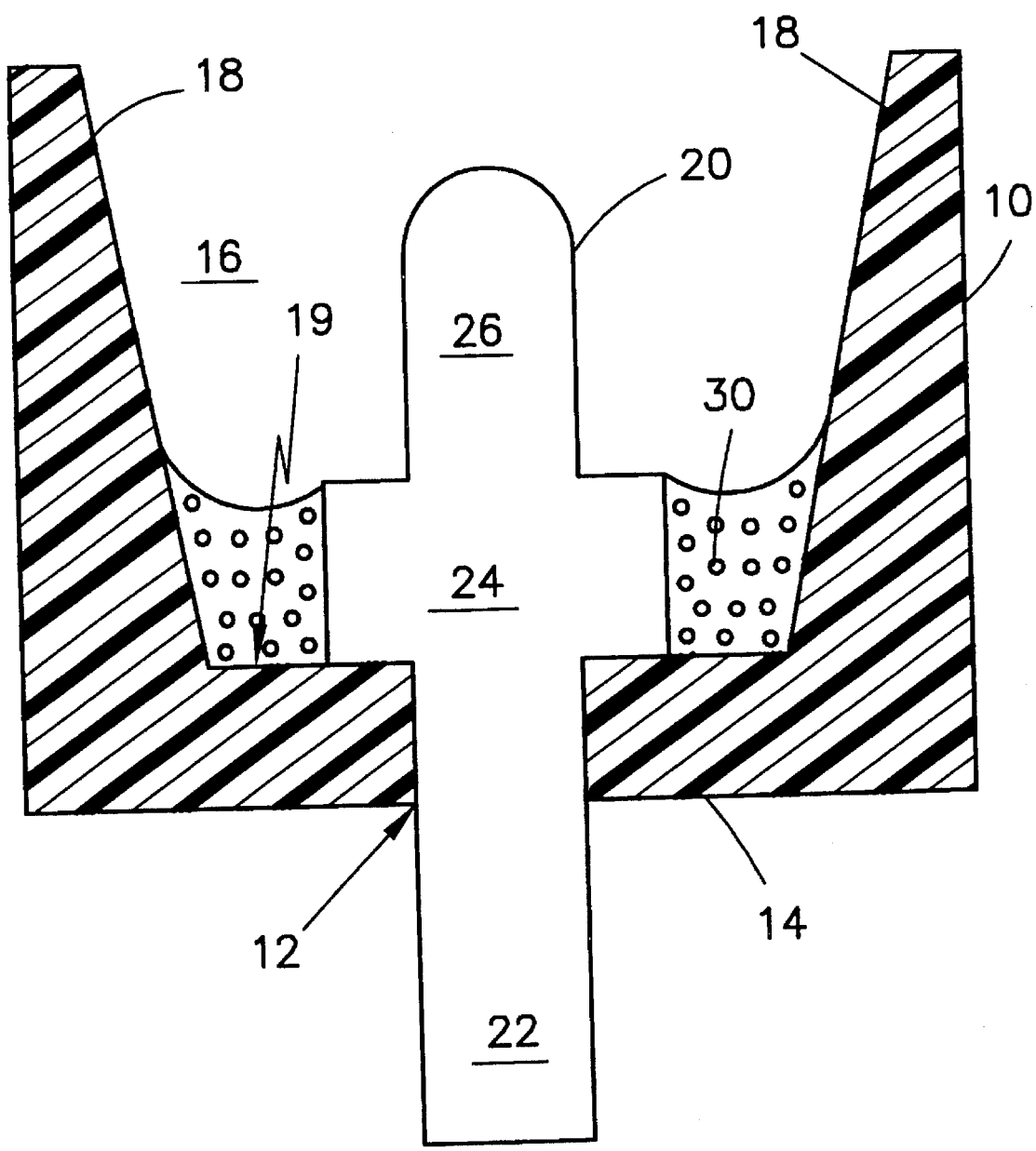
FIG. 1 is a cross-sectional view of the connector prepared using the process of the present invention.

Referring now to FIG. 1, there is shown a cross-sectional view of the hermetically sealed connector which is sealed using the process of the present invention. The connector itself is comprised of a machineable, or moldable, plastic connector housing 10, an electrical connecting pin 20 and a high temperature resistant sealing compound 30. Connector housing 10 is configured to have a hole 12 coming through a bottom side 14. Opposite hole 12 is a sealing cavity 16 which is formed by two side walls 18. Connecting pin 20 has a post portion 22, an annular portion 24 and a connecting post portion 26. As can be seen in FIG. 1, post portion 22 and connecting post portion 26 extend axially from annular portion 24. Post portion 22 is inserted through holes 12 in connector housing 10. Annular portion 24 comes in contact with a lower surface 19 of sealing cavity 16.

High temperature resistant sealant 30, or potting 30, is placed in sealing cavity 16 so as to come in contact with lower surface 19 of sealing cavity 16 as well as the interior surface of side walls 18. Furthermore, sealant 30 comes into contact with annular portion 24 of connecting pin 20.

Sealant 30 is a compound having numerous desirable properties. One such property is high lap shear adhesion to ensure strong adhesion to plastic connector housing 10. Another desirable property is a uniform coefficient of thermal expansion throughout the sealant material. Furthermore, this compound ensures adhesion to connecting pin 20. Examples of the type of compound used for sealant compound 30 are Stycast® 2850 FT with hardener Catalyst 11 both products of the Emerson & Cuming, Inc. of Woburn, Mass., and Scotch-weld™ 2214 a product of the 3M Corporation of St. Paul, Minn. It is important that the amount of sealing compound 30 be closely controlled. It is necessary to have enough sealing compound 30 to fill the portions of sealing cavity 16 which surround annular member 24 of connecting pin 20. Excessive amounts of sealant material 30 may be detrimental to the hermetic sealing qualities of the present connector.

Figure 3:
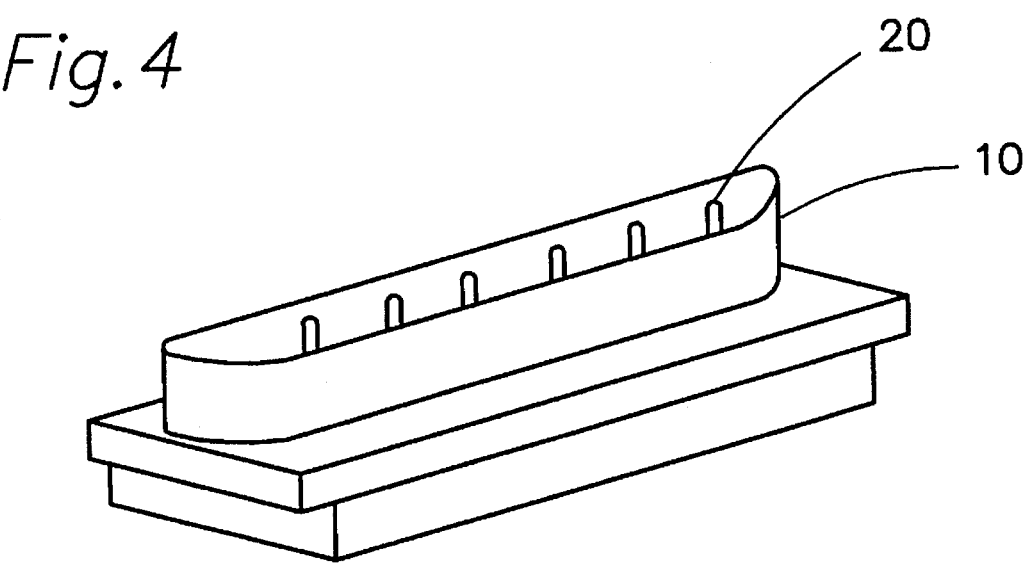
FIG. 3 is a perspective view of a connector utilizing the process of the present invention to create a hermetically sealed connector.

Referring now to FIG. 3, there is shown a perspective view of a connector which is sealed using the process of the present invention. The connector shown in FIG. 3 (known as a micro-miniature connector) has numerous connecting pins as well as a plastic connector housing 10. Further detail regarding this connector shown in FIG. 3 can be seen be referring back to FIG. 1. It is understood that the connector could have a plurality of connecting pins 20 therein. For purposes of clearly explaining the relationship between connector housing 10, connector pin 20, and high temperature resistant compound 30, only a single connector pin is shown in FIG. 1.

Figure 2:
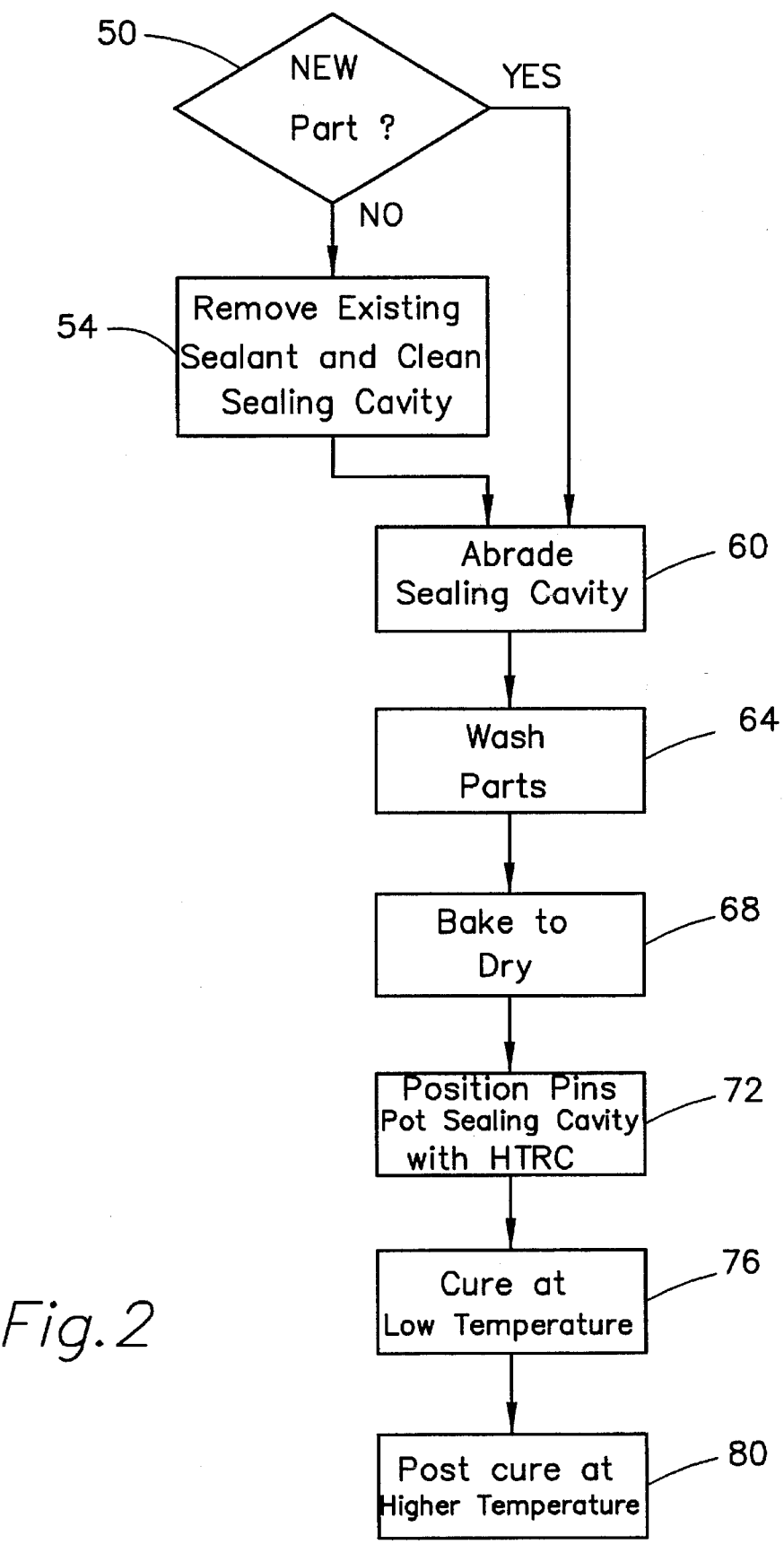
FIG. 2 is a flow chart showing the steps undertaken to seal the connector so as to create a hermetic seal.

Now referring to FIG. 2, there is shown a flow chart outlining the process of the present invention which provides a hermetically sealed electrical connector. Initially, it is noteworthy that the process can be used for both new parts and rework of existing "leaky" pans. Beginning at block 50, it must be determined whether the sealing process is going to be used on a new pan, or if an existing connector is to be reworked to provide a hermetically sealed connector. If the connector to be sealed is an existing connector which has been unsuccessfully sealed and now must be reworked, the process proceeds to step 54 where existing sealant is removed and sealing cavity 16 is cleaned. It is not necessary to remove all of the old sealant from sealing cavity 16; however, enough sealant must be used to allow for new seal to be created. Removal of existing sealant and cleaning can be achieved through several methods including physically scraping sealing cavity 16, chemically cleaning, or grit blasting. If it is recognized in decision block 50 that a new part is being used, the process moves to block 60 where sealing cavity 16 is abraded using alumina or an equivalent thereof. Other particulates could be used such as plastic particulates having sharp particle edges. Again, abrasion can be achieved a number of ways including physical abrasion or grit blasting. Similarly, once reworked parts from step 54 have had sealing cavity 16 cleaned and all existing sealant removed, these connectors proceed to step 60 wherein sealing cavity 16 is abraded. Next, in step 64, sealing cavity 16 is washed to remove abrasive residue. The parts are washed with a solvent (alcohol, acetone or water) to remove all unnecessary particles. Combinations of different solvents and cleaners can be used to accomplish the necessary cleaning. For example, the sealing cavity could be cleaned with water and then rinsed with acetone. Now the parts are moved to step 68 wherein the parts are baked at a high temperature to completely dry the parts after their washing. Now the plastic connector parts are at a point in which sealing cavity 16 is totally clean and dry with a rough surface from the alumina abrasion.

In the next step shown in block 72, pins 20 are placed in the sealing cavity and sealing cavity 16 is potted with a high temperature resistant compound or sealant 30. As previously mentioned, examples of this high temperature resistant compound 30 are Stycast® 2850 FT with hardener Catalyst 11, or Scotch-weld™ 2214. Sealing cavity 16 is to be potted with an appropriate amount of sealing compound to provide good adhesion to all surfaces. In the present embodiment, sealant fills the lower portion of sealing cavity 16, but does not go over the top of annular portion 24 of connecting pin 20. Excess sealant will interfere with the proper mating of connecting pin 20. Furthermore, excess sealant will detrimentally effect the lifetime of the hermetic seal by increasing thermally induced stresses. Next, in block 76, the connectors are cured at a low temperature for a period of time. This low temperature curing helps to minimize large meniscus and stress formation. Lastly, shown in step 80, sealant 30, or potting compound, is cured at a higher temperature to obtain full cure strength. Following this high temperature cure, the parts are brought back to room temperature at which point they form hermetic seals capable of withstanding many different temperature cycles. Specifically, the seal can maintain leak rates below $1 \times 10^{-5}$ atm. cm$^3$/sec. at a pressure differential of 1 atm. when exposed to temperature cycles ranging from −65° F. to 200° F.

The ability to maintain hermetic seals over numerous temperature cycles can be attributed to a number of facts. First, the high temperature resistant compound used as a sealant or potting material 30 has high lap shear adhesion properties to assure adhesion to the plastic body connector pans. The plastic body of the connector is abraded using the alumina to further enhance the adhesion properties of the sealant material. Furthermore, the sealant material contains a filler which provides strength. Additionally, this filler material remains evenly distributed throughout the sealant, thus reducing the thermally induced stress. Lastly, the filler used reduces the amount of shrinkage that occurs within the epoxy as the epoxy cures.

Figure 4:
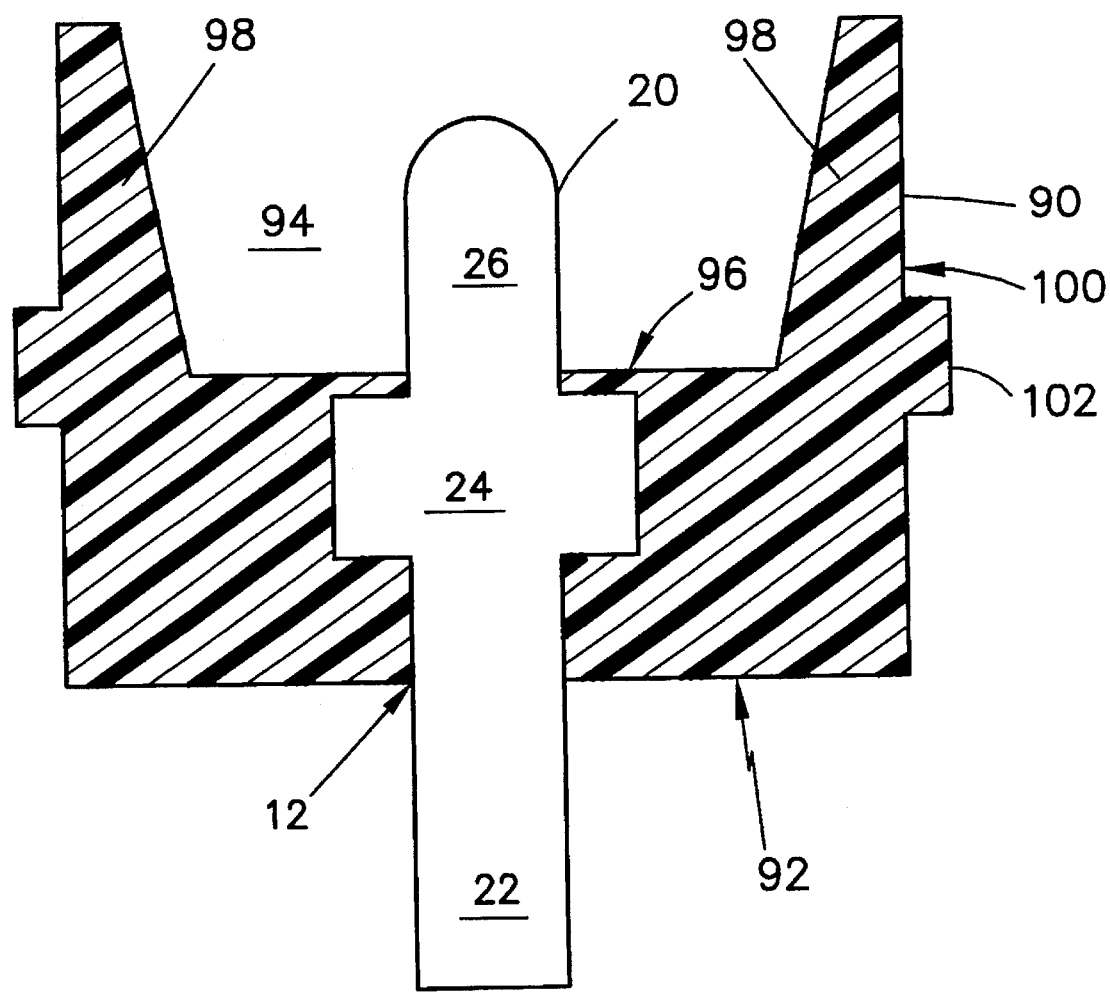
FIG. 4 is a cross-sectional diagram of a plastic connector wherein the connector pin is molded into the plastic connector housing.

Referring now to FIG. 4, occasionally a connector is utilized wherein connecting pin 20 is molded into the connector housing 90. Connecting pin 20 is identical to that used in the connector of FIG. 1. Further, identical parts shall retain their existing reference numerals. As shown in the FIG. 4, connector pin 20 has post portion 22 extending from a bottom side 92 of connector housing 90. Similarly, connecting post portion 26 extends from a lower surface 96 within a sealing cavity 94. Connector housing 90 also has a pair of side walls 98 extending upwardly from lower surface 96 to form sealing cavity 94. On an outer surface 100 of side wall 98 is attached a flange 102 extending outwardly from surface 100.

Due to thermal mismatches between connector pin 20 and connector housing 90, simply molding the connector pin 20 into connector housing 90 does not achieve a robust and lasting hermetic seal. Since a hermetic seal is not maintained, the connector of this configuration often leaks and, therefore, cannot be used where a hermetic seal is required. Leaks in the connector are often created over time due to the differences in thermal expansion coefficients between connecting pin 20 and connector housing 90. Thermal cycling of this part causes thermal expansion at different rates, thus creating the leaks in the connector.

To obtain a hermetic seal utilizing the connector shown in FIG. 4 the process previously described must be slightly altered. This altered process is shown in block diagram form in FIG. 5. Beginning in Step 110, the existing connector must be cleaned and baked. This cleaning and baking step is similar to that shown in the process of FIG. 2, wherein any existing sealant is removed and the exposed surfaces are washed and then baked to dry. It is noteworthy that the exposed surfaces of connector could also be abraded with alumina. As with the previously described method, alumina abrasion helps the adherence of sealant to the abraded surfaces.

Figure 6:
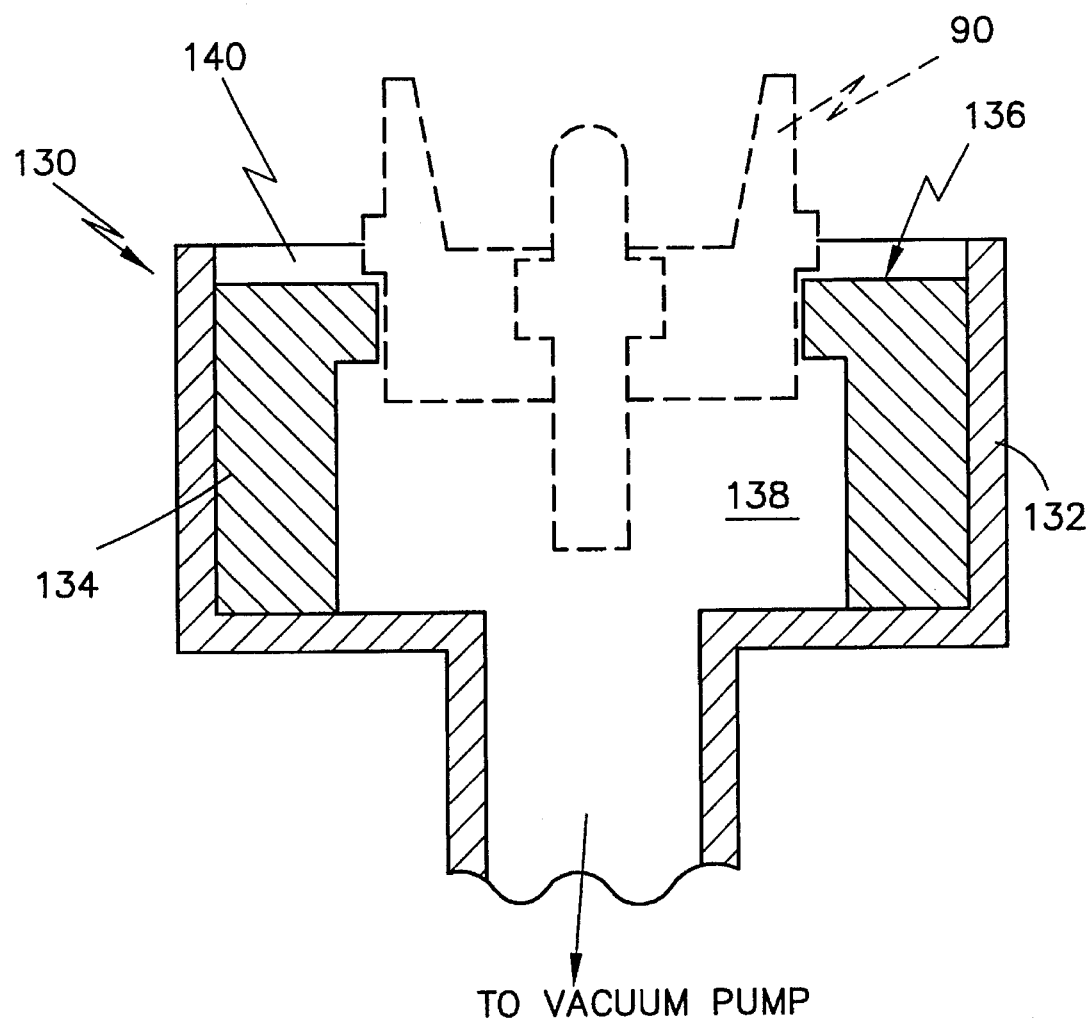
FIG. 6 is a cross-sectional diagram of a sealing fixture used to facilitate the process of FIG. 5.

Moving on to the next step, in block 112 connector housing 90 is mounted in a sealing fixture 130. Referring now to FIG. 6, there is shown a cross-sectional view sealing fixture 130. Sealing fixture 130 has an outer wall 132 and a mounting support 134 which are configured to facilitate and hold connector housing 90. Mounting support 134 is configured such that connector housing 90 can be inserted into an aperture therein, and flange 102 sits upon an upper surface 136 of mounting support 134. Mounting support 134, in conjunction with outer wall 132, creates an inner cavity 138 which is connected to a vacuum pump (not shown in FIG. 6). Upon upper surface 136 of mounting support 134 is placed an elastomaric potting material 140 such as silicon or polyurethane which serves as a gasket and creates a vacuum seal between inner cavity 138 and the outside wall. It will be recognized by those skilled in the art that FIG. 6 is just an example configuration of a mounting structure to create a vacuum on one side of connector housing 90 while leaving the other side exposed to a second predefined pressure. Many other configurations exist for accomplishing this and the device shown in FIG. 6 is merely exemplary.

Figure 5:
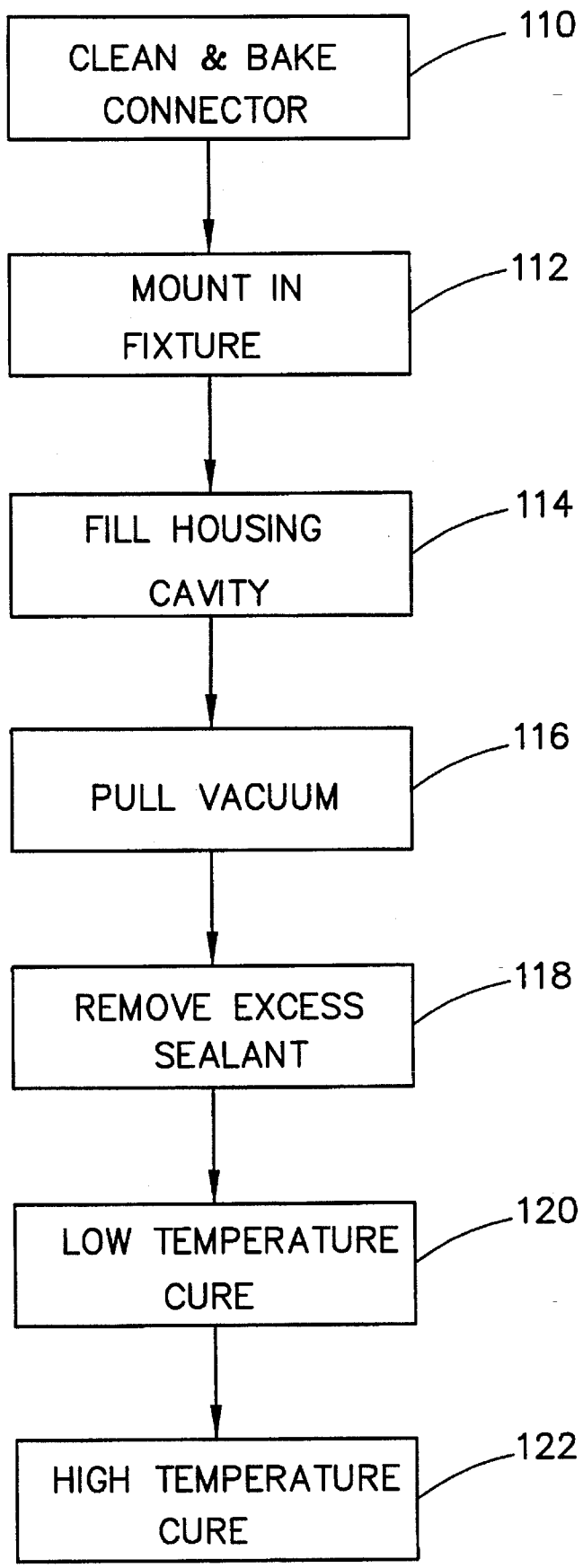
FIG. 5 is a flow chart illustrating the process used to seal the molded-in connector shown in FIG. 4.

Referring again to the process of FIG. 5, after connector housing 90 has been mounted in sealing fixture 130 as shown in Step 112, the process moves on to Step 114 where sealing cavity 94 is filled with a sealant material. In this process a low viscosity sealant must be used to allow the sealant material to seep into any cracks and openings between connector housing 90 and connecting pin 20. By maintaining a vacuum between sealing cavity 94 and bottom side 92 of connector housing 90, the low viscosity material will creep into any existing cracks and/or fractures in connector housing 90.

The process then moves on to Step 118 where the vacuum is removed and excess sealant is cleaned out of sealing cavity 94. In block 120, the remaining sealant material is cured at a low temperature. This low temperature cure allows hardening of the sealant while eliminating any shrinkage in the sealant material. Next in Step 122, the sealant is cured at a higher temperature to create strength in the sealant material. The low temperature cure 120 and high temperature cure 122 are identical to that used and described in relation to the process shown in FIG. 2.

The sealant material used in the process shown in FIG. 5 is very similar to the sealant used in the process of FIG. 2. The only difference between the two sealant materials is the viscosity and their ability to flow into crack and/or fractures in connector housing 90. To reiterate the sealant characteristics, the sealant has lap shear qualities to promote adhesion of the sealant material to the walls of connector housing 90, the sealant has a filler therein which is distributed evenly throughout the sealant, thus eliminating some problems of thermal expansion.

Having described the present invention in considerable detail, it should be apparent to those skilled in the art that certain modifications can be made without departing from the principles of the present invention.

We claim all modifications and alterations coming within the scope and spirit of the following claims.

1. A method of sealing an electrical connector having a connector housing made of a plastic, comprising the steps of:

abrading the connector so a sealing cavity of the connector has an abraded surface;

cleaning the sealing cavity so as to remove any abrading residue;

positioning a connector pin within the sealing cavity such that the connector pin extends through a lower surface of the sealing cavity;

potting the sealing cavity and connector pin with a sealant; and curing the sealant at a predefined temperature for a predetermined period of time.

2. The method of claim 1 further comprising the step of curing the sealant at a second predefined temperature for a second period of time, the second predefined temperature being higher than the first predefined temperature.

3. The method of claim 1 wherein the step of abrading the connector is accomplished by spraying the sealing cavity with an abrasive material.

4. The method of claim 3 wherein the abrasive material is alumina.

5. The method of claim 1 wherein the step of cleaning the sealant cavity includes the steps of:

chemically cleaning the sealing cavity; and baking the connector.

6. The method of claim 1 wherein the sealant is a high temperature resistant sealing compound with high lap shear adhesion property and uniform CTE throughout.

7. The method of claim 6 wherein the sealant is Scotchweld 2214.

8. The method of claim 6 wherein the sealant is Stycast 2850 FT with hardener Catalyst 11.

9. A method of sealing electrical connectors wherein the connectors are found to have leaks, the electrical connectors having a plastic connector housing, the method comprising the steps of:

removing existing material from a sealing cavity of the connector housing;

abrading the connector so a sealing cavity of the connector has an abraded surface, the abrading accomplished by spraying the sealing cavity with an abrasive material;

cleaning the sealing cavity so as to remove any abrading residue;

positioning a connector pin within the sealing cavity such that the connector pin extends through a lower surface of the sealing cavity;

potting the sealing cavity and connector pin with a sealant;

curing the sealant at a predefined lower temperature for a predetermined first period of time; and, curing the sealant at a predefined higher temperature for a predetermined second period of time.

10. The method of claim 9 wherein the step of removing all resisting material from the sealing cavity comprises chemically dissolving any existing material therein.

11. The method of claim 9 wherein the abrasive material is alumina.

12. The method of claim 9 wherein the step of cleaning the sealant cavity includes the steps of:

chemically cleaning the sealing cavity; and baking the connector.

13. The method of claim 9 wherein the sealant is a high temperature resistant sealing compound with high lap shear adhesion properties.

14. The method of claim 13 wherein the sealant is Scotchweld 2214.

15. The method of claim 13 wherein the sealant is Stycast 2850 FT with hardener Catalyst 11.

16. A method of sealing an electrical connector having a molded plastic connector housing and a molded-in connector pin, the method comprising the steps of:

abrading a sealing cavity with an abrasive material, the sealing cavity being a cavity within the connector housing which supports the connector pin;

cleaning the sealing cavity so as to remove any abrading residue;

creating a vacuum on a bottom side of the connector housing while exposing the sealing cavity to a second predefined pressure;

flooding the sealing cavity with a low viscosity sealant material;

removing the vacuum; and curing the sealant material for a first predetermined time at a first temperature.

17. The method of claim 16 further comprising the step of curing the sealant material for a second predetermined time at a second temperature, the second temperature being higher than the first temperature.

18. The method of claim 16 wherein the abrasive material is alumina.

19. The method of claim 16 wherein the step of cleaning the sealant cavity includes the steps of:

chemically cleaning the sealing cavity; and baking the connector.

20. The method of claim 16 wherein the sealant is a high temperature resistant sealing compound with high lap shear adhesion properties.

21. The method of claim 20 wherein the sealant is Scotchweld 2214.

22. The method of claim 20 wherein the sealant is Stycast 2850 FT with hardener Catalyst 11.

* * * * *